June 7, 1966  A. R. STECK  3,254,914
MOBILE HOME UNDERFRAME CONSTRUCTION
Original Filed Jan. 3, 1964  6 Sheets-Sheet 1
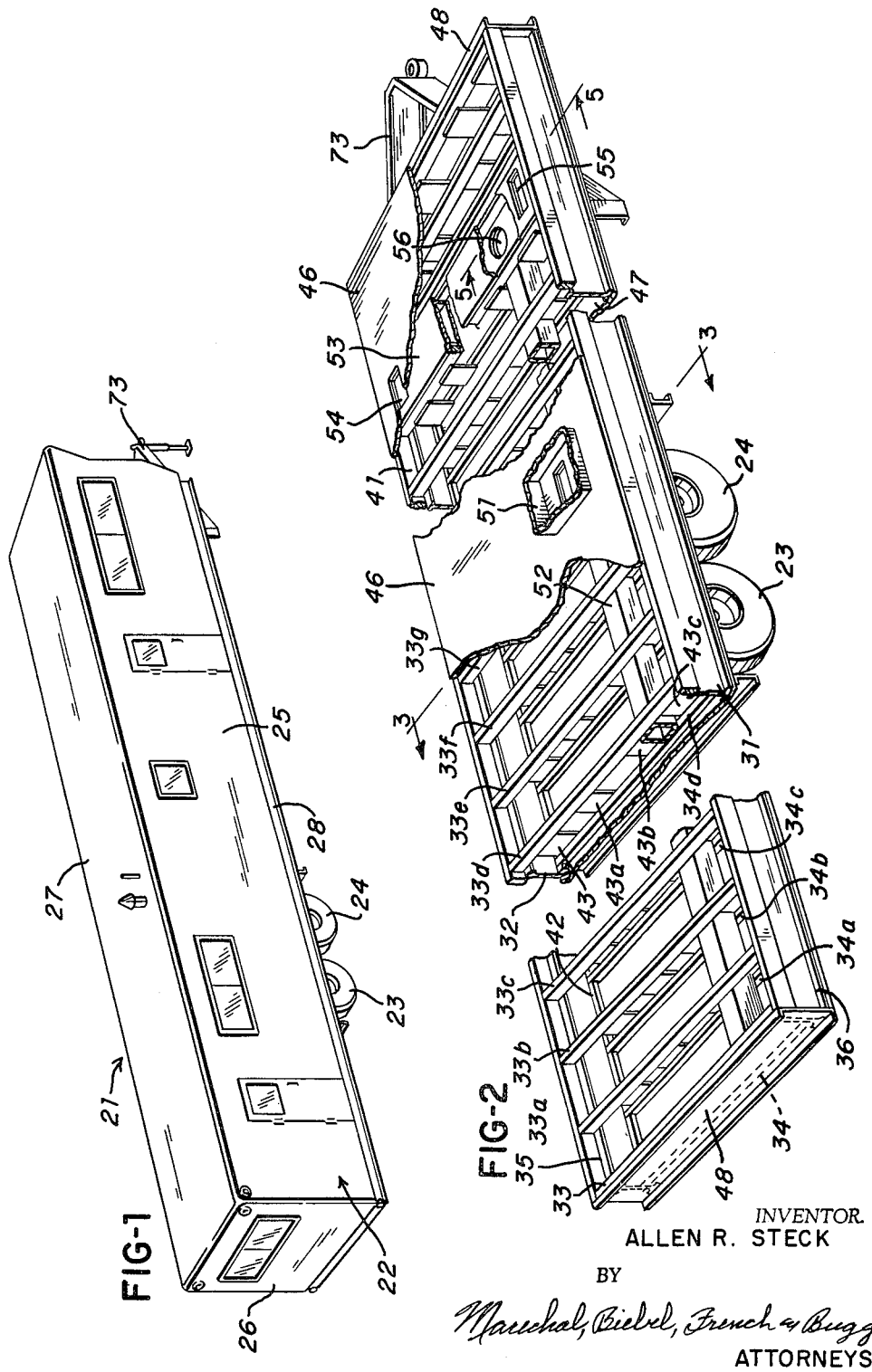
INVENTOR.
ALLEN R. STECK
BY
Marechal, Biebel, French & Bugg
ATTORNEYS

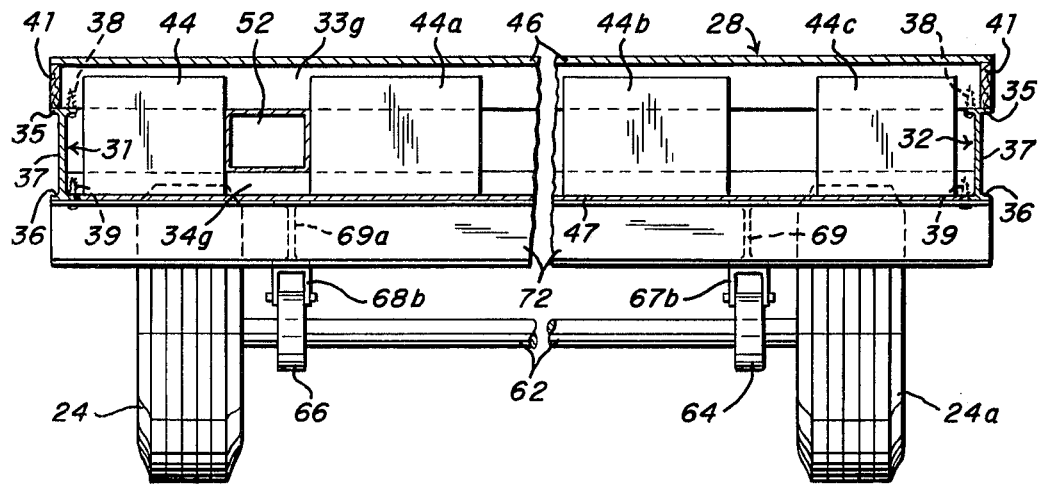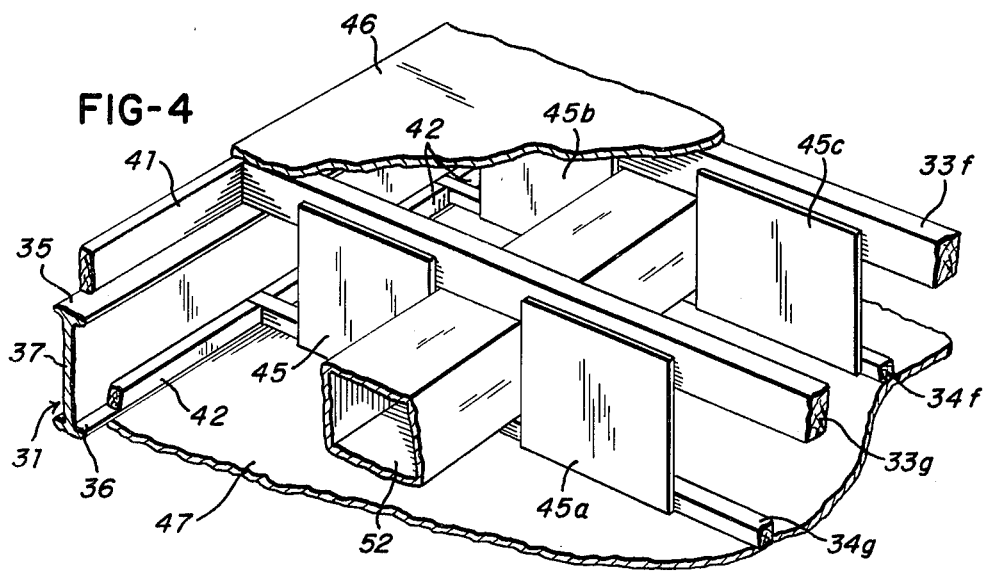

June 7, 1966  A. R. STECK  3,254,914
MOBILE HOME UNDERFRAME CONSTRUCTION
Original Filed Jan. 3, 1964  6 Sheets-Sheet 3
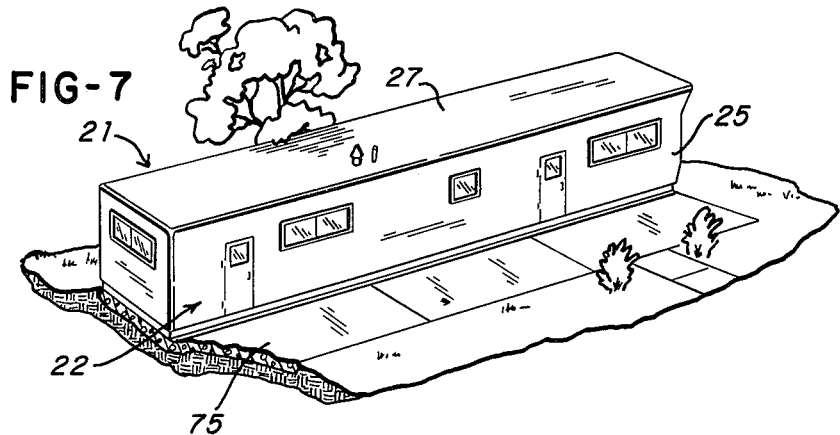
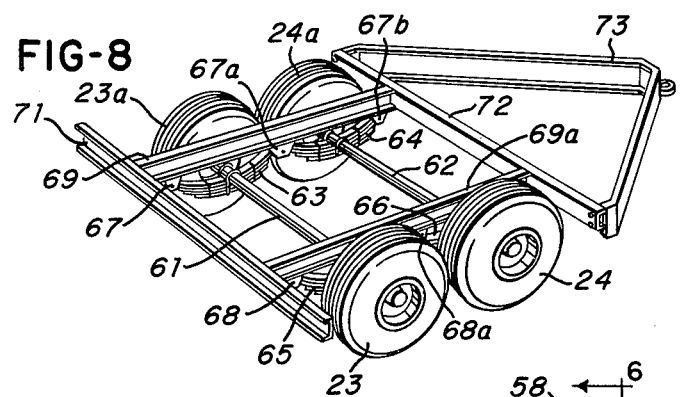
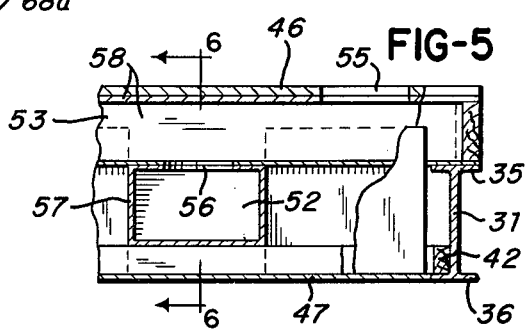
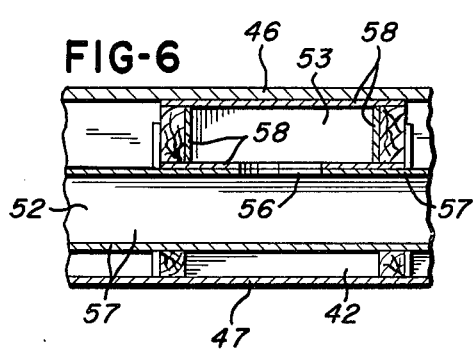
INVENTOR.
ALLEN R. STECK
BY
Marchal, Biebel, French & Bugg
ATTORNEYS

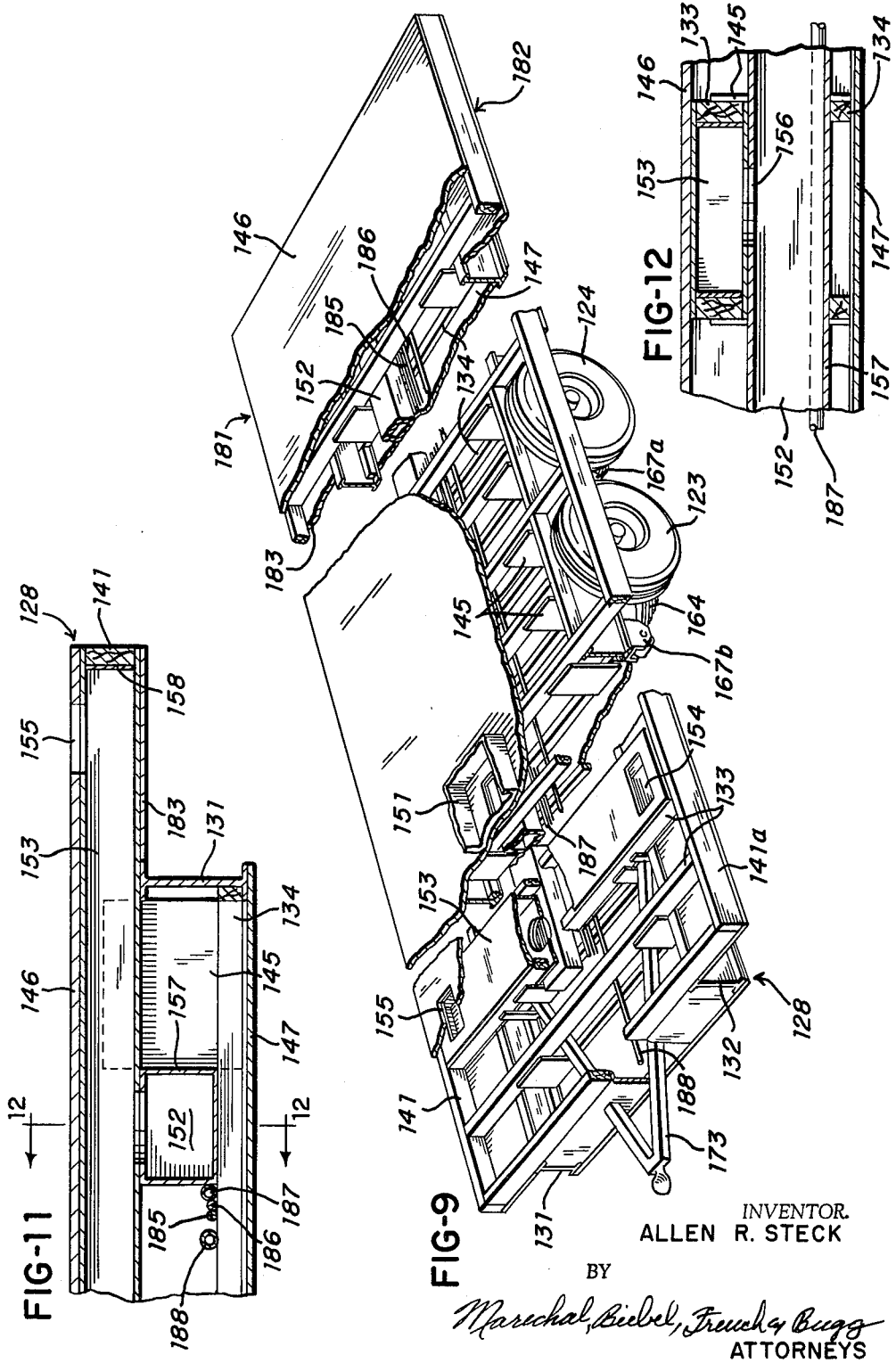

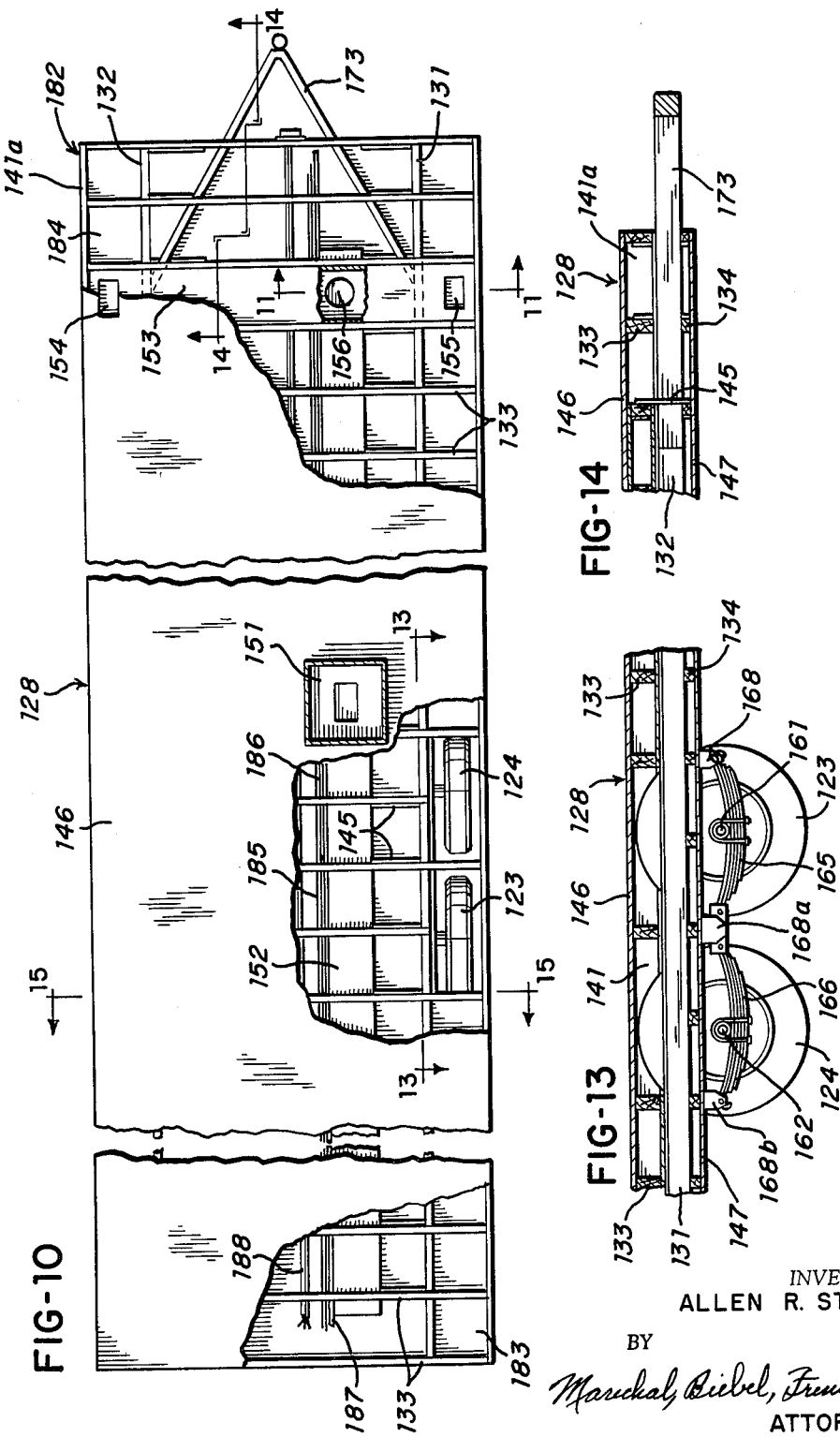

June 7, 1966    A. R. STECK    3,254,914
MOBILE HOME UNDERFRAME CONSTRUCTION
Original Filed Jan. 3, 1964    6 Sheets-Sheet 6
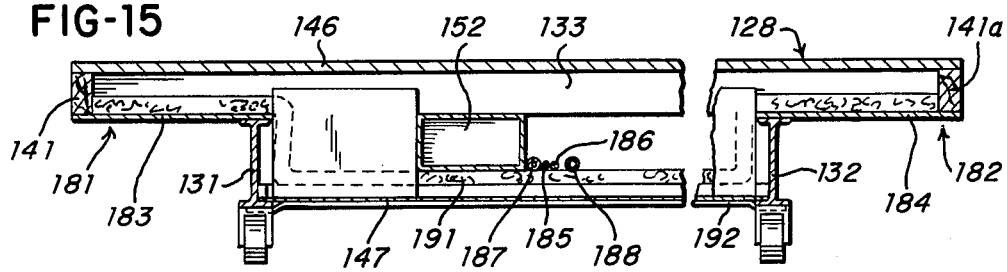
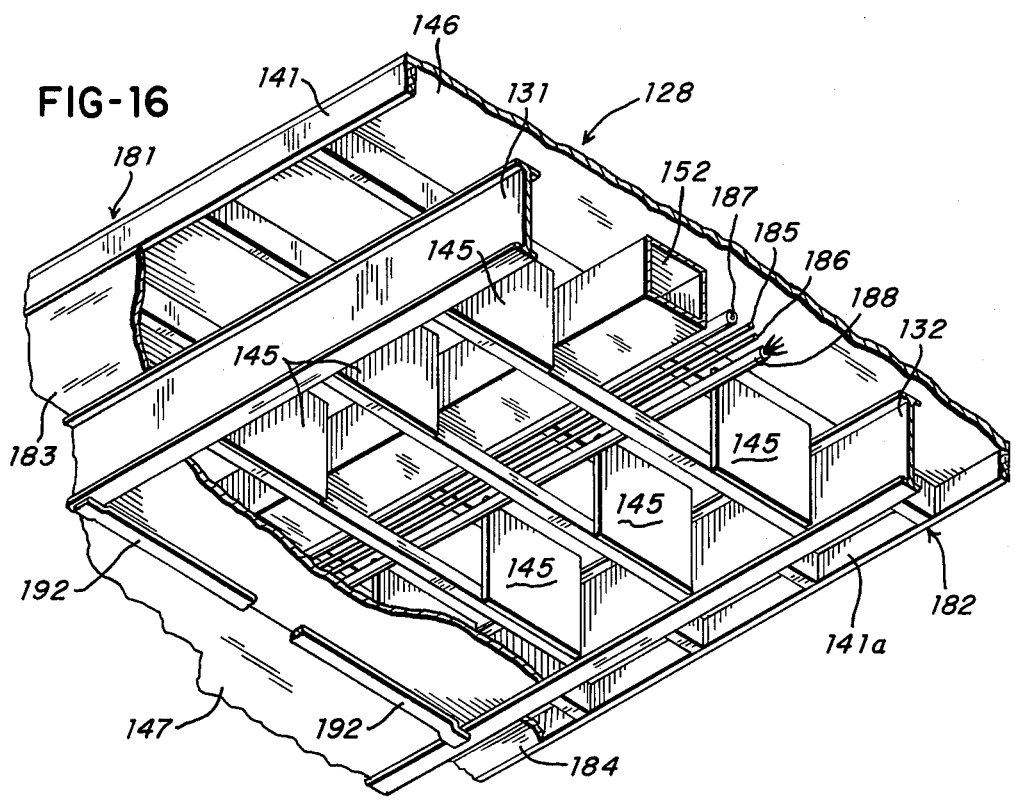
INVENTOR.
ALLEN R. STECK
BY
Mareschal, Biebel, French & Bugg
ATTORNEYS

United States Patent Office 3,254,914
Patented June 7, 1966

3,254,914
MOBILE HOME UNDERFRAME CONSTRUCTION
Allen R. Steck, Brookville, Ohio, assignor to Vindale Corporation, Brookville, Ohio, a corporation of Ohio
Continuation of application Ser. No. 335,485, Jan. 3, 1964. This application May 26, 1965, Ser. No. 465,818
17 Claims. (Cl. 296—28)

This application is a continuation of my copending application Serial No. 335,485, filed January 3, 1964, now abandoned.

The invention disclosed and claimed in this application relates to house trailers and to the construction thereof, and especially to the construction of undercarriage frames, bases, or beds for such trailers, these frames not only forming light strong supports for the trailers but also providing basements therefor.

Heretofore, trailers have been constructed in a great number of ways. However, usually longitudinal metallic members are secured together by similar metallic beams placed crosswise between such longitudinal beams and secured thereto. Then the floor, sides and top of the house trailer are built on top of these cross-wise metallic beams. The result is that the bed or base of the trailer is either not strong enough or else more probably is extremely heavy and little or no space is provided for a heated basement or even for the convenient introduction of such desirable features as heating ducts, hot and cold water supply pipes, drain pipes, and electric wiring, inasmuch as the cross-wise and/or longitudinal beams often interfere with the continuity of such ducts, pipes and wiring.

One of the objects of the invention hereof is the provision of a construction of a base for a house trailer which is relatively strong.

A further object of the invention disclosed herein is the provision of a construction of a base for a house trailer which is relatively light.

A further object of the invention disclosed herein is the provision of a base for a house trailer which has a relatively high strength-weight ratio.

A further object of the invention is the provision of a house trailer in which there is provided a heated basement.

A further object of the invention is the provision of a construction of a base for a house trailer so arranged as to facilitate ease of installation of heating, plumbing, and wiring, eliminating the necessity for running plumbing and heating lines above the floor level.

A further object of the invention is the provision in a mobile home of the equivalent of a radiant heated floor provided by the construction of heat from a duct positioned inside of the basement of the trailer to heat the basement and then by conduction from the basement through the floor to the interior side of the floor.

A further object of the invention is the provision of a mobile home or house trailer of such construction that such mobile home or house trailer may be produced with substantially any desired floor plan on virtually the same frame and floor jig.

A further object of the invention is the provision in a mobile home or house trailer of an underframe, base or bed having at least a 5% reduction in weight over conventional frames with increased strength, thereby achieving economies in undercarriage requirements.

A further object of the invention is the reduction of direct labor and overhead required in building a base, bed or underframe for a mobile home or house trailer.

A further object of the invention is the reduction of the material cost required to build a base, bed or underframe for a mobile home or house trailer.

Further objects, features and advantages of the invention will be apparent from the following specification, the accompanying drawings illustrating several embodiments of the invention and from the claims following the specification.

In the drawings:

FIG. 1 is a view in perspective of a house trailer forming one embodiment of the invention involved herein and constructed in accordance with the said invention;

FIG. 2 is a fragmentary perspective view (with parts broken away) of a bed or base or undercarriage frame structure upon which the trailer shown in FIG. 1 is built and of a part of the supporting wheel and towing bar structure therefor;

FIG. 3 is a view in vertical section of the base and wheel structure shown in FIG. 2 taken substantially on the line 3—3 of FIG. 2 and looking in the direction of the arrows;

FIG. 4 is a fragmentary perspective view similar to a portion of FIG. 3 but looking in a somewhat opposite direction and shown on an enlarged scale in order to show more clearly the construction involved;

FIG. 5 is a fragmentary view in vertical section taken substantially on the line 5—5 of FIG. 2;

FIG. 6 is a fragmentary view in vertical section taken substantially on the line 6—6 of FIG. 5;

FIG. 7 is a view in perspective, showing the mobile home of FIG. 1, with the wheel structure and towing bar structure removed and with the home permanently installed upon a concrete slab placed upon the earth;

FIG. 8 is a view in perspective of the wheel and towing bar truck removed from the house so that the truck may be moved back to the factory;

FIG. 9 is a fragmentary view in perspective and with parts broken away and showing the bed or base or lower frame of another mobile home constituting another embodiment of the invention involved herein;

FIG. 10 is a fragmentary plan view of the bed or base or frame shown in FIG. 9, intermediate portions being broken away;

FIG. 11 is a fragmentary view in vertical section of said bed, or base, or frame of FIG. 9 taken substantially on the line 11—11 of FIG. 10, and one side being broken away;

FIG. 12 is a fragmentary view in vertical section, both ends being broken away, and taken substantially on the line 12—12 of FIG. 11;

FIG. 13 is a fragmentary view in vertical section, both ends being broken away, and taken substantially on the line 13—13 of FIG. 10;

FIG. 14 is a fragmentary view in vertical sections, the rear end being broken away and the sections being taken substantially on the line 14—14 of FIG. 10;

FIG. 15 is a fragmentary view in vertical section with intermediate parts broken away, and taken substantially on the line 15—15 of FIG. 10; and FIG. 16 is a fragmentary view in perspective looking upward from under a portion of the bed, base, or frame, shown in FIGS. 9 and 10, the bottom cover being removed so that the interior construction may be seen.

Referring now especially to FIGS. 1, 2, 3 and 4 for a more detailed description of the first disclosed embodiment of the inventions as applied to a full perimeter frame, it may be seen that there is shown a house trailer generally designated 21 having a body 22 and wheels such as 23 and 24 supporting the trailer. The body 22 is provided with side walls such as 25, with end walls such as 26, and with a top such as 27.

The body 22 is carried by a base structure or bed or lower frame 28 (i.e., an undercarriage frame) which is shown most clearly in FIGS. 2, 3 and 4. This bed structure comprises a pair of longitudinally extending transversely spaced structural metallic beams such as the I- beams 31 and 32. Supported on top of the I-beams on the top flange thereof are a plurality of longitudinally spaced, transversely oriented upper wooden joist or cross members such as 33, 33a, 33c, 33d, etc. Supported on the lower flange are a plurality of transversely oriented lower wooden cross members 34, 34a, 34b, 34c, 34d, etc., which may be preferably as shown, of a similar cross-sectional dimension than the members 33, 33a, etc. It will be seen that these lower cross members 34, 34a, etc., are positioned with their ends between the top flanges 35 and the bottom flanges 36 of the I-beams and that the lower members 34, 34b, etc., rest upon the inwardly extending bottom flanges 36 of the I-beams (e.g., see FIG. 3). These lower members 34 thus may, as shown, abut the web 37 which joins the flanges 35 and 36.

The upper cross members 33 and 33a, etc., are joined to the upper flange of the I-beams 31 and 32, as best shown in FIG. 3, by screws such as 38, and the lower cross members 34, 34a, etc., are joined to the inwardly extending lower flange of the I-beams by screws such as 39. Trim members such as 41 are provided outside the ends of the upper cross members 33, 33b, etc., and spacer members such as 42 (see FIG. 4) are provided between the lower cross members 34, 34a, etc., on the lower edge or flange of the I-beams.

The upper and lower cross members are aligned generally vertically to form pairs of cross members. In FIG. 4, 33f and 34f are shown as one aligned pair and 33g and 34g are shown as a second aligned pair. Each pair of aligned cross members are secured together by a plurality of gussets or braces such as the plywood gusset plates 43, 43a, 43b, and 43c shown in FIG. 2, the plates 44, 44a, 44b and 44c shown in FIG. 3, and the plates 45, 45a, and 45b and 45c shown in FIG. 4. The gusset plates form a small portion of the total width of the trailer and are preferably arranged in transversely spaced apart relations and in longitudinally oriented rows.

A floor 46 for the mobile home is positioned above and is secured to the upper surface of the upper cross members 33, 33a, 33b, 33c, 33d, 33e, 33f, 33g, etc. A bottom cover 47 is secured underneath of the structure to the lower cross members 34, 34a, 34b, 34c, 34d, 34e, 34f, 34g, etc.

The I-beams 31 and 32, the upper cross members 33, 33a, etc., the lower cross members 34, 34a, etc., the gussets 43, 44, 45, etc., the floor 46 and the bottom cover 47 form a box braced base structure and forms a very strong, very lightweight base or bed or frame for the trailer, said base having a much higher strength-weight ratio than structures previously used. This box structure is enclosed on top by the floor 46, on the bottom by the cover 47, on the sides by the I-beams 31 and 32 and on the ends by appropriate end pieces such as 48 to form a relatively tight enclosure. This structure also provides an enclosed basement for the house trailer or the mobile home with substantially unrestricted longitudinal passageways between adjacent gusset plates. In this basement there can be included plumbing and electrical and heating pipes, conduits and ducts, as shown. This basement becomes heated by conduction from the hot air ducts themselves so that even the upper side of the floor 46 is heated by conduction from the basement, and becomes reasonably warm.

The heating system is shown in FIGS. 2, 5 and 6. Therein may be seen the furnace 51, the main longitudinal duct 52 and the forward lateral duct 53, the latter being provided with register openings 54 and 55. Other register openings not shown are provided in the longitudinal duct 52. As shown best in FIGS. 5 and 6, the main longitudinal duct 52 is connected by an opening 56 with the forward lateral duct 53. As also shown, the ducts 52 and 53 are lined on all four sides with metal as at 57 and 58, respectively.

Means are provided including the wheels 23 and 24 and the complementary wheels 23a and 24a for supporting the trailer while travelling (see FIGS. 2, 3 and 8). Intermediate the wheels 23 and 23a and carrying the wheels is an axle 61 and intermediate the wheels 24 and 24a is an axle 62. These axles support an auxiliary wheel supporting frame. The frame includes springs 63, 64, 65 and 66 which are supported by the axles 61 and 62 and which are attached, by spring hangers such as 67, 67a, 67b, 68, etc., to short longitudinally extending metallic members 69 and 69a. The members 69 and 69a are secured (as by welding for example) to metallic cross members 71 and 72 which are shown as channel members. The members 71 and 72 are secured, as by bolting, to the undersides of the lower flanges 36 of longitudinally extending members 31 and 32. Also secured under the longitudinally extending members 31 and 32 near the front of said members, as by bolting to the underside of the lower flanges thereof, is a tow bar unit 73 which is formed substantially in the shape of a V. It may be formed of a channel section metallic beam as shown. The auxiliary wheel frame is thus formed of beams 71 and 72, beams 69 and 69a, spring hangers 67, 67a, 67b, 68, etc., springs 63, 64, 65 and 66, and axles 61 and 62, and forms a truck for supporting the trailer body 22.

If desired, the house trailer body 22 may be removed from the auxiliary wheel frame or truck and placed permanently upon the earth as for example upon a concrete slab shown at 75 in FIG. 7. To do so, the bolts, which attach the cross members 71 and 72 beneath the I-beams 31 and 32, are removed. Also, the bolts which attach the tow bar 73 underneath the longitudinal members 31 and 32, are removed. Then the body 22 is removed from the auxiliary wheel frame and is lowered onto the slab 75. Thereafter the tow bar 73 is attached as shown in FIG. 8 as by bolts to the cross member 72. The towing rig including the auxiliary wheel frame and wheels and the tow bar can then be returned to the factory in order to be used for the transportation of another mobile home.

In FIGS. 9 to 16 inclusive, there is shown an embodiment of the invention as applied to an outrigger frame and wherein many of the parts are indicated by the same numerals with the addition of 100. Thus, in FIGS. 9 to 16 and especially in FIGS. 9 and 10 there is shown a base or bed or lower frame 128 having inwardly set, longitudinal I-beams 131 and 132, and upper and lower wooden cross members 133 and 134 respectively. The lower cross members 134 extend to the I-beams 131 and 132 and rest upon the lower ledges thereof between the lower flange and the upper flange. The upper cross members 133 are of a length corresponding to the width of the trailer and extend well beyond the I-beam members, and provide overhangs as at 181 and 182. Preferably, only two gusset plates 145 are used, and are positioned in transversely spaced relation next adjacent the inside of the I-beams 131 and 132, defining a substantially unrestricted longitudinally extending basement space therebetween.

The overhang is in each case covered underneath with a sheathing as at 183 and 184 in order to prevent dust and dirt from the road from getting into the "basement." The furnace 151 is located in a slightly different position being nearer the center of the base. Thus the position of the furnace is not critical. The trim members 141 and 141a are of course placed at the extremes of the overhang.

As shown especially in FIGS. 9, 10 and 16 there are provided, in addition to the heating ducts such as 152 and 153, hot and cold water pipes 185 and 186 and a waste outlet pipe 187. There is also provided electrical wiring 188.

The spring hangers 167a and 167b, etc. (see FIG. 9), are secured as by welding directly to the I-beam 132 and the corresponding hangers 168, 168a and 168b (see FIG. 13) are also secured directly to the I-beam 131 by welding.

As shown in FIG. 15, a blanket of insulation 191 is preferably provided and positioned to conform to the contour of the sheathing 183 and 184 and the lower cover 147. This insulation is not shown in any of the drawings 1–14 and 16 because it would obscure some of the other features which it is necessary to show and because the drawings are believed to be clearer without the insulation. However, it is preferably provided in all cases to prevent heat losses and to insulate the trailer.

Metallic braces such as 192 suitably secured across the lower flanges of the I-beams 131 and 132 are provided for securing the lower cover 147 in place.

The outrigger frame construction of this embodiment is thus characterized by rigidity and lightweight. The gusset plates 45 or 145 are narrow as compared to the total width of the space between the I-beams 131 and 132 thereby defining therebetween an unrestricted, longitudinally extending, open space or basement within which the plumbing and the like may be received. In addition, the transversely oriented upper cross members 133 are supported in cantilever fashion by the rectangular construction formed by the gusset plates 145 and the lower cross members 134. It will also be appreciated that the lower cross members need not be of the same size or strength as the upper cross members, since the load placed thereon is primarily one of compression rather than bending and thus smaller wooden pieces, such as 2 x 2's, may be used.

The embodiments of the invention disclosed herein accordingly provide a lightweight mobile home frame construction which may be employed in either a perimeter frame or an outrigger frame. Although the preferred embodiments of the invention employ plywood gusset plates and wooden top and bottom cross members, it is within the scope of this invention to employ other material. It is also preferable that the gusset plates be rectangular, and be aligned longitudinally of the length of the frame in order to provide the longitudinally unrestricted basement space therebetween. When the flooring is affixed to the upper cross members, its strength is added to the total frame. Preferably, this flooring consists of plywood sheets which are screwed or otherwise suitably nailed directly to the upper cross members. This construction, therefore, provides a high degree of resistance to transversely applied loads.

While several specific forms of house trailers have been described herein and while these specific forms constitute preferred embodiments of the invention it is to be understood that the invention is not limited to these precise forms and that various changes may be made therein without departing from the spirit and scope of the invention which is defined by the appended claims.

What is claimed is:

1. A mobile home frame structure comprising:
   a pair of transversely spaced beams each extending generally horizontally, each having a pair of flanges having upper and lower substantially flat surfaces generally in horizontal places, and each having an elongated web joining said pair of flanges and having the side surfaces of said web generally in vertical planes;
   a plurality of upper cross members extending horizontally and generally perpendicular to the beams, resting on and secured to the upper surfaces of both of the beams;
   a plurality of lower cross members extending horizontally and generally perpendicular to the beams, having their ends extending between the upper and lower flanges of the beams, having said ends resting on the upper surfaces of the lower flanges of said beams, and each positioned substantially vertically below and thus aligned with one of said first mentioned upper cross members;
   means comprising a plurality of substantially vertically extending gussets each secured to one upper cross member and to its vertically aligned lower cross member for securing each said pair of aligned members together; and
   means comprising a cover secured to the upper surfaces of all of said upper cross members for securing said members together.

2. A trailer structure comprising:
   a pair of transversely spaced metal beams each extending generally horizontally, each having a pair of flanges having upper and lower substantially flat surfaces generally in horizontal planes, and each having an elongated web joining said pair of flanges and each said web having its side surfaces generally in vertical planes;
   a plurality of upper wooden members extending horizontally and generally perpendicular to the metal beams, and resting on and secured to the upper surfaces of both of the metal beams;
   a plurality of lower wooden members extending horizontally and generally perpendicular to the metal beams, having their ends extending between the upper and lower flanges of the metal beams, having said ends resting on the upper surfaces of the lower flanges of said metal beams, and each positioned substantially vertically below and thus aligned with one of said first mentioned wooden members;
   means, comprising a plurality of substantially vertically extending gussets each secured to one upper wooden member and to its vertically aligned lower wooden member for securing each said pair of aligned wooden members together;
   means comprising a cover secured to the upper surfaces of all of said upper wooden members for securing said members together;
   wheels supporting said metal beams;
   side and end walls supported on said cover;
   a roof supported on said side and end walls; and
   means comprising a tow bar for drawing said structure on said wheels.

3. The structure of claim 2 in which said wooden members, said gussets and said cover form a box braced base for said trailer and in which there are provided in the hollow of said base:
   a heating duct;
   water pipes; and
   electrical connections.

4. The structure of claim 2 in which there is provided a bottom secured underneath said lower wooden members and in which said wooden members, said gussets, said bottom, and said cover form an enclosed box braced base for said trailer and in which there are provided in the hollow of said base:
   a heating duct;
   water pipes; and
   electrical connections.

5. The structure of claim 2 in which the wheels are inward from said longitudinally extending beams.

6. The structure of claim 2 in which the wheels are outward from said longitudinally extending metallic beams.

7. The structure of claim 2 in which the wheels are positioned outward from said longitudinally extending metallic beams but inward from the sides of said house trailer vehicle.

8. The structure of claim 2 in which the wheels supporting said structure are secured to an auxiliary wheel supporting frame consisting of:
   a pair of laterally extending metallic beams connected to and positioned beneath said longitudinally extending metallic beams;
   a pair of supplementary metallic beams extending longitudinally parallel to but inward and below said previously mentioned longitudinally extending beams and secured to said laterally extending metallic beams;

a plurality of spring hangers secured to and beneath said supplementary longitudinally extending beams; springs secured to said spring hangers; and at least one axle secured to said springs and carrying said wheels.

9. A frame for a mobile home comprising:
a pair of spaced apart beams extending the length of said home,
a plurality of transversely positioned upper members positioned on an upper surface of said beams in longitudinally spaced apart relation for supporting a floor thereon,
a plurality of lower transverse cross members corresponding in relative longitudinal position to said upper cross members and extending into supported relation with one of said beams at each end of said cross members forming cooperating pairs of upper and lower cross members,
a plurality of gusset plates extending between the upper and lower members of said pairs and rigidly secured at said cross members with at least two of said gusset plates being provided for each of said cross member pairs in transversely spaced relation, with the width of each individual gusset plate forming a small part of the width of said mobile home and defining an open space therebetween.

10. The frame of claim 9 wherein said gusset plates are positioned on said member pairs in generally longitudinally aligned relationship providing therebetween a longitudinally extending basement for the substantially unrestricted running of conduits, conductors and the like.

11. A frame for a mobile home comprising:
a pair of spaced apart beams extending the length of said home along the perimeter thereof,
a plurality of transversely positioned upper wooden cross members positioned on an upper surface of said beams in longitudinally spaced apart relation for supporting a floor thereon,
a plurality of lower wooden transverse cross members each corresponding in relative longitudinal position to one of said upper cross members and extending to and connecting with one of said beams at each end of said cross members forming cooperating pairs of upper and lower cross members,
a plurality of gusset plates extending generally vertically between the upper and lower members of each of said pairs and rigidly secured at said cross members with at least two of said gusset plates being provided for each of said cross member pairs in transversely spaced relation, with the width of each individual cross member forming a small part of the width of said mobile home and defining an open space therebetween,
said gusset plates being positioned on said member pairs in generally longitudinally aligned relationship providing therebetween a longitudinally extending basement for the substantially unrestricted running of conduits, conductors and the like.

12. An outrigger frame for a mobile home, comprising:
a pair of spaced apart I-beams extending longitudinally of the home having a spaced apart width less than the width of said home,
a plurality of longitudinally spaced upper cross members extending transversely of said I-beams and supported on the upper surfaces thereof and extending outwardly of said I-beams with a transverse length corresponding generally to the width of said home,
a plurality of lower cross members there being one of said lower members for each of said upper members and extending between said I-beams with the ends thereof being supported on the inwardly extending bottom flanges of said I-beams,
and a pair of transversely spaced gusset plates for each of said cross member pairs with said plates being rigidly affixed to the top and bottom members of said cross member pairs and being transversely spaced from each other inwardly of said I-beams providing cantilever support for the portions of said top members which extend outwardly of said I-beams and providing therebetween a basement for said mobile home.

13. An outrigger frame for a mobile home, comprising;
a pair of spaced apart I-beams extending longitudinally of the home having a spaced apart width less than the width of said home,
a plurality of longitudinally spaced upper wooden cross members extending transversely of said I-beams and supported on the upper surfaces thereof and extending outwardly of said I-beams with a transverse length corresponding generally to the width of said home,
a plurality of lower wooden cross members there being one of said lower members for each of said upper members and extending between said I-beams with the ends thereof being supported on the inwardly extending bottom flanges of said I-beams,
and a pair of transversely spaced plywood gusset plates for each of said cross member pairs with said plates being rigidly affixed to the top and bottom members of said cross member pairs and being transversely spaced from each other inwardly of said I-beams and next adjacent said I-beams providing cantilever support for the portions of said top members which extend outwardly of said I-beams and providing therebetween a basement for said mobile home.

14. A mobile home frame and truck assembly comprising:
a pair of spaced apart beams extending generally longitudinally lengthwise of said home;
a plurality of transversely positioned upper joist members on an upper surface of said beams in longitudinally spaced relation for supporting a floor thereon;
a plurality of lower transverse cross members supported by said beams at each end thereof beneath said upper member;
rigid brace means laterally spaced between said beams securing pairs of said upper joist members and lower cross members together;
a truck for said frame including a pair of transversely extending beams connecting with said longitudinally extending beams and positioned therebeneath;
a pair of supplementary beam members extending longitudinally parallel to but inwardly and below said previously mentioned longitudinally extending beams and secured to said transversely extending beams;
spring hangers secured to said supplementary beam members;
leaf springs secured to said spring hangers;
and a transverse axle and wheel assembly secured to said springs for supporting the weight for road travel.

15. The mobile home of claim 14 further comprising means removably mounting said truck as a unit on said frame.

16. The underframe construction of a mobile home which is braced to provide rigidity and resistance against statically applied loads during use in a fixed location as a home and against twisting and transverse shaking during transportation and which further provides an enclosed basement forming a longitudinal passageway for placement of plumbing, wiring, heating conduits and the like therein comprising a pair of spaced-apart, longitudinally-extending support beams having upper and lower portions, a plurality of transversely-oriented joists supported in longitudinally spaced-apart relation on said upper portions of said beams, flooring supported on the upper surfaces of said joists, a plurality of rigid braces defining open spaces therebetween positioned transversely of said beams in the space therebetween and having upper and lower ends, means connecting the upper end of each said brace to a joist, means connecting the lower ends of said braces to said lower portion of said beams transmitting such static loads from said flooring to said lower portions of said beams and bracing said underframe construction against twisting and transverse shaking, and sealing means extending between said beams from a region adjacent said lower portion of one of said beams to a corresponding region of the said other beam enclosing the space between the beams forming an enclosed basement for the placement therein of such heating conduits, plumbing, wiring, and the like.

17. The mobile home underframe construction of claim 16 in which said beams are I-beams having upper and lower flanges and said rigid braces include lower transverse portions having opposite ends supported on said I-beam lower flanges forming thrust transmitting connections with said I-beams.

References Cited by the Examiner

UNITED STATES PATENTS

| | | | |
|---|---|---|---|
| 2,346,130 | 4/1944 | Evans | 296—28 |
| 2,656,196 | 10/1953 | Fellabaum | 280—81 |
| 2,756,000 | 7/1956 | Anderson | 98—10 X |
| 2,834,599 | 5/1958 | Sarchet | 280—30 |
| 2,846,263 | 8/1958 | La Rue | 296—28 |
| 2,899,237 | 8/1959 | Nash | 296—35 |
| 2,982,580 | 5/1961 | Lewis | 296—28 |
| 2,993,728 | 7/1961 | Beran et al. | 296—28 |
| 3,036,856 | 5/1962 | Bock | 296—28 |
| 3,087,741 | 4/1963 | De Lay | 290—81 |
| 3,188,694 | 6/1965 | Hammar | 296—28 X |

BENJAMIN HERSH, *Primary Examiner.*

E. E. PORTER, *Assistant Examiner.*